April 27, 1965

A. B. GROSE 3,180,354

FUEL CONTROL VALVE

Filed Nov. 7, 1962

INVENTOR.
ANSEL B. GROSE

INVENTOR.
ANSEL B. GROSE

United States Patent Office 3,180,354
Patented Apr. 27, 1965

3,180,354
FUEL CONTROL VALVE
Ansel B. Grose, 8 Mount Vernon St., Stoneham, Mass.
Filed Nov. 7, 1962, Ser. No. 236,767
5 Claims. (Cl. 137—436)

This invention relates to an improved fuel control valve for use with carburetors for internal combustion engines.

This application is a continuation-in-part of my co-pending application Serial No. 93,899, now abandoned, filed March 7, 1961.

Most carburetors presently used with internal combustion engines are coupled with high fuel input pressures which require a sensitive, positively functioning valve member for insuring the regulation of flow of the fuel between the fuel pump and the float chamber of present-day types of carburetors.

In most prior art devices a conventional needle valve assembly has been utilized to regulate the flow of the fuel. These assemblies in general included a main body provided with an elongated orifice extending therein, the orifice generally terminating in a transverse flat surface to provide a seat and the flow of the fuel through the orifice is wholly or partly interrupted by a conical shaped end portion of a valve plunger positioned in said orifice. As in conventional in carburetors the relative positioning of the conical shaped end portion with respect to the periphery of the orifice is controlled by a buoyant float member within the float chamber of the carburetor. As the buoyant float rises in response to the rise of the fuel in the fuel chamber of the carburetor, it is adapted to engage the plunger to force the conical shaped end portion thereof into engagement with the edge of the orifice forming valve seat in the flat transverse surface.

Such conventional types of needle valve assemblies have caused serious difficulties in the past for, in most instances, due to the metal contact between the conical shaped end portion and the relatively sharp periphery of the orifice in the valve seat a very rapid wearing of either the conical end or deformation of the seat itself took place. Thus, the high fuel pressure required in present-day high compression engines caused early failure of both the valves and the seats of such assemblies.

Additionally, the relatively large reduction which is required on the fuel level before the conical portion can properly disengage the seat caused an extreme reduction in engine efficiency at high speeds. At such speeds, when the demand for fuel is relatively high, the level of the fuel within the float chamber required a considerable drop in said level before the conical end portion could emerge far enough out of the orifice to permit sufficient fuel to enter the carburetor, this caused a "lean out" of fuel at high speeds and resulted in extremely inefficient engine performance.

Further, most conventional needle valve assemblies of this nature fail to hold high fuel pump pressures and even a slight particle of dirt or other foreign matter on the tapered end of the valve or seat would cause leakage and other difficulties.

Several different constructions of valves have been devised in the past with a view to overcoming the above difficulties. One of the most practical prior art valve constructions was that of replacing the needle valve with a valve member having a disk of resilient material such as rubber or the like which is adapted to engage an annular valve seat and which disk is so constructed as to have self-fitting characteristics with the annular seat. While overcoming most of the difficulties encountered with needle type valves, such self-adjusting resilient disks defined in the latter structure also failed in that they soon became inoperative either due to deterioration of the rubber disk or the deformation thereof due to repeated engagement and disengagement thereof with the annular seat, which engagement and disengagement was throughout the same engaging areas, with the result that said areas soon became deformed thereby permitting leakage and failure of proper response throughout long periods of use.

The primary object of the present invention, therefore, is directed to overcoming the difficulties encountered with the above-mentioned types of valves through the provision of a valve arrangement wherein the moving valve part will have a constantly changing area of contact with the valve seat and which will be extremely sensitive and positive in its action throughout a greatly prolonged period of use as compared with known prior art valves of this nature.

Another object is to provide a valve of the character described wherein all of the working parts thereof are carefully controlled as to their related dimensions in order to produce maximum efficiency under all conditions of use.

A further object of the invention is to provide a valve assembly which eliminates flooding by providing a positive cutoff in the input fuel supply; which will positively operate in response to extremely small variations in fuel level within the carburetor; that will be extremely resistant to wear and deformation of the mating parts and which will be positive in its function either when the motor is idling or operating at varying speeds.

Another object is to provide a novel ball valve arrangement for carburetors which, as compared with known existing ball valves in general, is so constructed and dimensionally controlled with respect to its related parts that, during its operation, it will positively seat with its valve seat regardless of the line of force imparted thereon by the rise of the float in the fuel chamber; which will have a floating spinning action when disengaged from the valve seat and thereby cause a spraying action of the fuel passing therearound when being forced under pressure from the fuel pump and which spinning has a self-cleansing action for the removal of any foreign matter which might become lodged on said ball or valve seat.

Another object is to provide a novel ball valve arrangement of the above character wherein an intermediate ball is provided for forcing said first ball valve member into engagement with the valve seat in response to pressure on said intermediate ball by the rise of the float in the fuel chamber whereby a more positive free sealing action of the first ball valve member with said valve seat will be insured and whereby the valve parts and housing therefor may be initially assembled as a unit and with the first ball valve member being carefully located in proper operative cooperation with the valve seat and thereafter retained in said relation.

Another object is to provide a housing for a ball valve construction of the above nature having an outer hex-shaped portion which enables the housing and said assembled ball valve and intermediate ball member to be assembled and disassembled as a unit from the carburetor by the use of a wrench.

Another object is to provide a ball valve arrangement of the above character having a magnet located internally of the valve housing in spaced cooperative relation with the ball valve and which is adapted to more positively insure proper alignment and seating of the ball valve with its valve seat.

Other objects and advantages of the invention will become apparent by referring to the following description taken in connection with the accompanying drawings in which.

Figure 1:
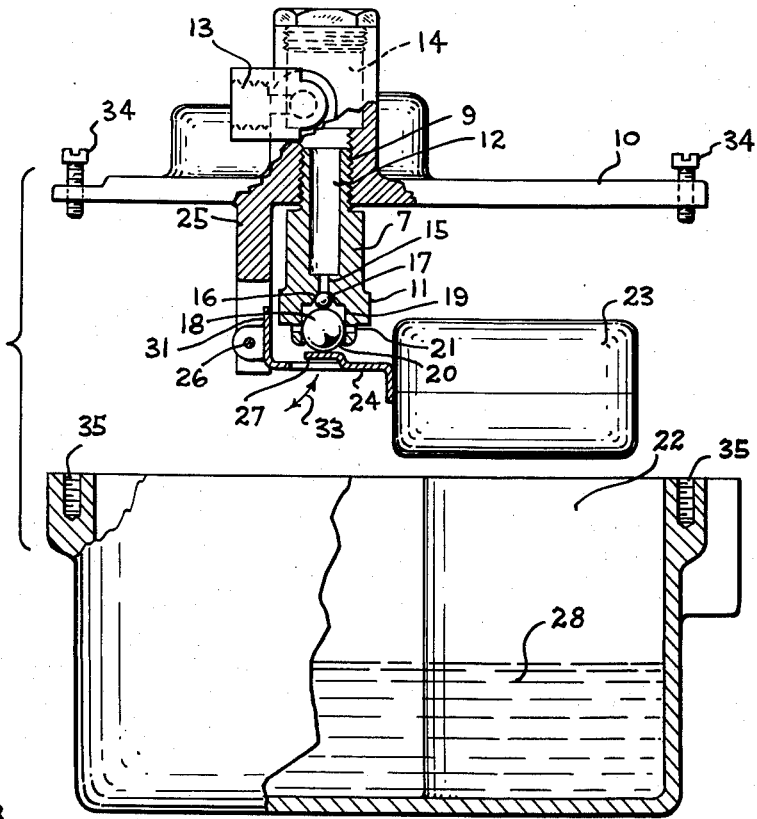
FIG. 1 illustrates one of the preferred embodiments of the invention installed in a conventional carburetor, wherein only the significant parts of the carburetor are shown in exploded relation with each other and wherein certain of the parts are shown in cross-section.

Referring more particularly to the drawings wherein like characters of reference designate like parts throughout the various views, the device embodied in the invention comprises a main body portion 7 having a threaded end portion 8 by means of which the said body portion may be threadedly attached as at 9 to the fuel chamber cover plate 10 of a conventional type carburetor. Exteriorally of the main body portion there is provided an hexportion 11 whereby the said body portion may be threaded into or out of the threaded opening 9 in the cover plate by the use of a wrench instead of a conventional slot and screwdriver arrangement. Internally of the main body portion 7 there is a fuel orifice 12 communicating with the main fuel coupling 13 by means of which a main fuel line from a conventional fuel pump, not shown, is connected with the carburetor. The fuel entering the coupling 13 is fed into a chamber 14 and from said chamber through the fuel orifice 12. The fuel orifice communicates with a restricted passageway 15 having at its lower end a hollow tapered section 16 which is of an acute angle of approximately 41° and which communicates with an annular valve seat 16 in said tapered section on the side thereof toward the adjacent end of the passageway.

The small ball valve 17 which will hereinafter be referred to as a ball valve is positioned within the hollow tapered section and is held therein by a backing ball 18 located within an enlarged recessed area 19 having straight parallel side walls internally of the lower end of the main body portion 7 and which communicates with said hollow tapered section. The ball 18 is loosely held in the recessed area by displacing the lower edge of the open end of the main body portion slightly inwardly as illustrated at 20. The extent of displacement being so controlled that about ¼ of the diameter of the ball 18 is allowed to protrude outwardly of said inwardly displaced edge. With the hereinafter given fuel line pressure and horsepower of engine, the ball valve 17 is preferably of a diameter of approximately 7/64 or .1093 of an inch and the passageway 15 is preferably 9/10 or .098 of the diameter of the ball valve 17 or approximately 1/10 less than the diameter of ball valve 17.

The backing 18 is preferably of a diameter of approximately 9/32 of an inch or of a diameter of approximately 2½ times that of the ball valve 17 and the recessed area 19 in which it is positioned is of a diameter of from approximately .005 to .007 of an inch greater than the diameter of said ball 18. The related diameter of the ball valve 17 is designed so as not to expose too much of the area of the ball valve to the fuel pressure thereby insuring a positive seal of the ball valve with the valve seat and with no leakage at any time when the ball valve is moved to closed position.

In the present instance the valve is designed for use with a fuel pump pressure of from 4 to 6 lbs. per square inch and is designed for use with engines of approximately 150 horsepower. However, it is to be understood that with engines of greater horsepower the related proportions of the passageway 15, ball valve 17, and backing ball will be proportionately varied or increased in accordance with the change or increase of horsepower and the change or increase in fuel pump pressure. While the ball valve 17, with the above-described arrangement, is stated as being preferably approximately 7/64 of an inch in diameter it could be varied from 1/16 to 7/32 of an inch in diameter keeping in mind, of course, that the related dimension of the passageway 15 and valve seat would be varied to retain the above-mentioned dimensional characteristics. The backing ball 18 would, of course, also be varied in related proportion. This is to adapt the valve for use with engines of different horsepowers and for use with different fuel line pressures.

The recessed area 19 is provided with transverse openings 21 whose axes are above the center of the ball 18 whereby the fuel being forced through the orifice 12 and passageway 15, when the ball valve 17 is disengaged from the valve seat 16, will be permitted to flow about the ball 17 outwardly of the openings 21 into the fuel chamber 22. A float 23 connected by an arm 24 to a support 25 through a pivotal connection 26 is adapted to be positioned internally of the fuel chamber when the cover 19 is in assembled secured relation with said chamber. The arm 24 is provided with an adjustable contact 27 which is adapted to engage the ball 18 when the fuel 28 in the fuel chamber rises and in turn causes the float 23 to rise. When the fuel 28 reaches a desired level, the rise of the float 23 will be such as to cause the intermediate ball 18 to engage the ball valve 17 and in turn force it into intimate contact with the seat 16 and thereby shut off the flow of fuel into the fuel tank 22.

Figure 2:
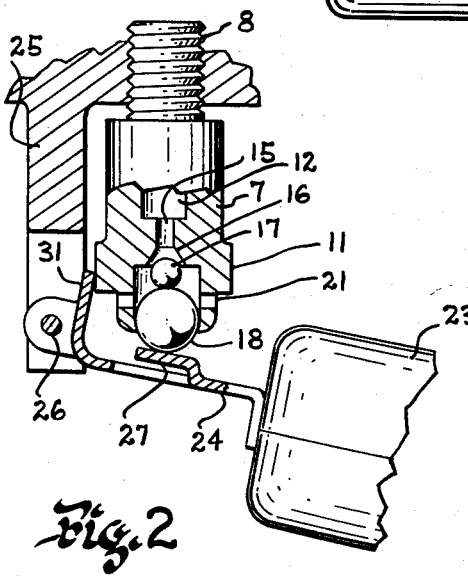
FIG. 2 is an enlarged fragmentary partially sectioned view of the valve construction illustrated in FIG. 1 showing it in open position and in associated relation with the float and its supporting parts.
Figure 3:
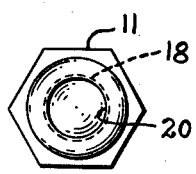
FIG. 3 is a bottom plan view of the valve assembly.

As diagrammatically shown in FIG. 2, when the level of the fuel 28 lowers in response to its consumption during the operation of the engine, the float 23 will, in turn, fall in the direction indicated by the arrow 33 thereby relieving pressure on the intermediate ball 18 which, in turn, allows the ball valve 17 to be forced out of engagement with the valve seat 16 by the pressure in the fuel line or by the action of gravity to again permit the fuel to flow through said valve into the fuel tank. This movement of the float 23 in response to the change of fuel level is extremely critical being only of the magnitude of a few fractions of an inch whereby the fuel is substantially immediately replaced in proportion to its consumption during the operation of the engine regardless of the speed of operation thereof.

With the present arrangement the parts are so assembled as to permit the ball valve 17 and backing ball 18 to rise and fall about 1/16 to 3/32 of an inch in response to the movement of the float. A drop of the ball valve 17 to about .020 of an inch out of engagement with the valve seat is equal to full opening of the orifice 15 causing maximum flow of fuel. This is equal to approximately ⅛ of an inch float drop. The related dimensions of the passageway 15, ball valve 17, and the angle of the seat 16, are so controlled that the force of the fuel under the above-mentioned pressure has a tendency to cause the ball valve 17 to spin with a sort of floating action rather than to be completely dislodged from the valve seat thereby causing the fuel to be dispensed with more of a spraying action rather than a squirting action such as takes place with a needle type valve. This spinning action not only produces a self-cleaning action for removing any foreign matter which might become lodged on the ball or valve seat but further causes different areas of the ball to be presented to the valve seat when again forced thereagainst by the pressure exerted on the ball 18 when the float 23 rises. By this it is meant that the area of the ball 17 is so shifted due to said spinning action that it never re-engages with the seat 16 with the same area of contact thereby greatly prolonging the life and durability of the valve.

The level of the fuel in the fuel tank in response to the opening and closing of the ball valve 17 may be varied by adjustment of the adjustable contact member 27 on the lever 24. The related dimensions of the orifice 15, size of ball valve 17 and the angle of the seat 16 are further controlled in accordance with the length of the lever and pressure on said ball valve resulting therefrom. The length of lever is the distance between the pivot 26 and the point of engagement of the contact 27 with the ball 18. In the present instance, this distance is from ⅜ to ½ of an inch.

The float in all instances is prevented from lowering more than a controlled amount by an adjustable finger 31 carried by the arm 24. The finger 31 is adapted to engage with the side of the main body portion 7 of the fuel control valve when the float is permitted to move downwardly as the fuel level in the fuel chamber lowers and thereby restricts the extent of downward movement of the float, as shown in FIG. 2. The float 23 is of the usual conventional hollow type.

It will be noted by reference to FIG. 1 wherein the valve is shown in closed position and to FIG. 2 wherein the valve is shown in open position that there is a relatively small extent of movement of the float required to bring about this open position, particularly in view of the fact that FIG. 2 is a considerably enlarged view as compared with FIG. 1.

It is further noted that when the float moves about the pivot 26, the adjustable contact moves in an arc as represented by the arrow 33 and that the pressure on the ball 18 in response to the raising of the float 23, is, therefore, not along the longitudinal axes of the openings 12 and 15. With prior art needle type valves which have been previously described, this lack of straight line movement of the adjustable contact 27 would cause such prior art valves to tilt and in many instances fail to close the tapered ends thereof in sealed contact with the prior art type of contact seats. This was due primarily to the fact that the angling of the tapered end produced an elliptical contact with a circular seat.

With the present construction, however, failure of the ball valve 17 to have a positive seating and sealing action with the contact seat is overcome by the tendency of the ball 18 to roll in response to the arcuate movement of the adjustable contact 27 simultaneously to its upward movement thereby causing more of a straight line pressure to be imparted upon the ball valve 17. The intermediate ball 18 further, by reason of the fact that it has a relatively point contact both with the adjustable contact 27 and ball valve 17, offers little or no frictional resistance and thereby insures instantaneous and positive function of said ball valve. This arrangement has overcome one of the major problems encountered with the prior art needle type valves. Also, by reason of the rolling action of the intermediate ball 18, it, in turn, does not make the same contact with the adjustable contact 27 and with the ball valve 17 thereby further insuring less wear and longer function.

The valve including its main body portion and sealed-in intermediate ball 18 and ball valve 17 by the displacing of the lower free edge 20 inwardly enables the entire valve unit to be initially assembled with the various parts thereof in precontrolled functional relation with each other and further enables the entire valve to be removed or replaced as required without danger of injury or altering of any of the working parts thereof.

As stated above the related proportions of the ball valve 17, intermediate pressure ball 18 and fuel passageway 15 are dimensionally controlled in accordance with the fuel line pressure and the horsepower of the motor with which the carburetor is to be used so as to insure that the proper amount of fuel will be allowed to pass through the valve at all times.

It is to be understood, however, that with motors of greater horsepower and with fuel lines of greater pressure, the related proportions of said respective parts will be altered accordingly. However, each will be retained in the same related proportions even though they might be overall dimensionally changed.

It has been found that if the diameter of the ball valve 17 with respect to the restricted passageway 15 is not carefully controlled, the desired floating spinning action of the ball valve 17 will not be attained so that the control of the related proportions thereof, as previously set forth, are of extreme importance, it being understood, of course, that they might be altered slightly with no appreciable detrimental effect.

The entire valve and float assembly carried by the cover plate 10 is properly supported within the fuel chamber when the cover member 10 is in secured relation with said fuel chamber 22. This is accomplished by the use of suitable bolts or the like 34 which are adapted to be threaded into the threaded bores 35 formed in the upper sides of the fuel chamber 22.

Figure 5:
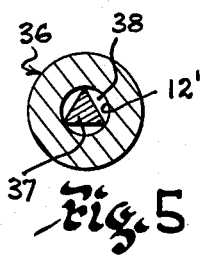
FIG. 5 is a sectional view taken as on line 5—5 of FIG. 4 looking in the direction of the arrows.
Figure 4:
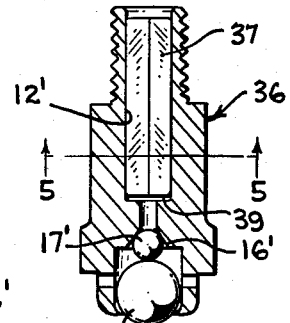
FIG. 4 is an enlarged view of a modified form of the invention.

In FIGS. 4 and 5 there is shown a slight modification of the invention wherein the valve 36 is identical in construction with the above described valve with the exception of having a triangular shaped magnet 37 placed within the fuel passageway 12'. The magnet is in the form of a barlike member having a triangular cross-sectional shape such as to provide fuel passageways 38 between said magnet and the inner walls of the passageway 12'. The end 39 of the magnet is located at a predetermined spaced relation with the steel ball valve 17' say, from 1/32 to 3/8 of an inch away from the ball, so as not to exert too strong a magnetic force thereon but is such as to aid in insuring that the ball 17' properly seats within the tapered valve seat 16' when moved toward said valve seat by pressure exerted upon the intermediate ball 18' in response to the rise of the float as previously described. The force of the magnet 37, therefore, is so controlled as to insure that the ball valve 17' will be forced away from the valve seat 16' by the pressure of the fuel in the fuel line so as to permit free flow of the fuel about said ball 17' when pressure is released upon the intermediate ball 18'. The valve otherwise functions identically the same as the previously described valve.

It is further pointed out that in connection with both of the valve constructions the dimension of the ball valve 17 or 17' is so controlled relative to the valve seat 16 or 16' and the size and extent of movement of the backing ball 18 or 18' is also so controlled that in no instance is the ball valve permitted to become dislodged from within the tapered valve seat 16 or 16'.

With the present valve arrangement gas is fed through the valve from the fuel line substantially immediately in response to the consumption of the fuel from the fuel chamber and, therefore, not only keeps pace with the consumption of the fuel at varying speeds of operation but also positively insures against flooding of the carburetor. The present valve construction, therefore, not only is extremely sensitive and positive in its action but also has been found to be much more durable than any known prior art valve construction.

The fact that the valve can be assembled and disassembled from the carburetor by the use of a wrench as results from the hex-head construction thereof as contrasted with most prior art valves which have a slot in the lower end thereof and which require the use of a screwdriver to remove and replace the valve, no working parts of the present valve are susceptible to injury such as often happened with the above-mentioned prior art constructions.

The ball valve 17 or 17' and the intermediate ball 18 or 18' are preferably formed of stainless steel but may be made of Monel, brass or of a plastic material such as Teflon or the like if desired, or may be of glass or ceramic material.

It has also been found that with the valve of the present construction the float level can be set lower because of more positive lever control and further because it maintains a more positive level of gas in the carburetor at all times under varying speeds and operating conditions. This arrangement has further been found to result in greater gas economy while also permitting much smoother operation of the engine under all conditions of use. This is contrary to the results which have been possible to attain with prior art needle type valves for such valves required greater movement of the float for high speed operation and resulted in the slow speed settings as always being too high in order to compensate for proper high speed operation. This was due to the fact that the float setting with prior art type needle valves had to be compromised to get more uniform operation at high speeds in order to get acceptable operation at idling speeds. With most prior art needle valves it has been necessary in the past to increase the idle speed particularly with automatic transmissions and resulted in great gas consumption and often caused the car to creep.

With the present valve all of the above difficulties have been overcome for it permits smooth operation of the engine at all speeds and permits slower smooth idling with the result that there is no tendency for the car to creep and further with the result of much greater economy in gas consumption.

Figure 6:
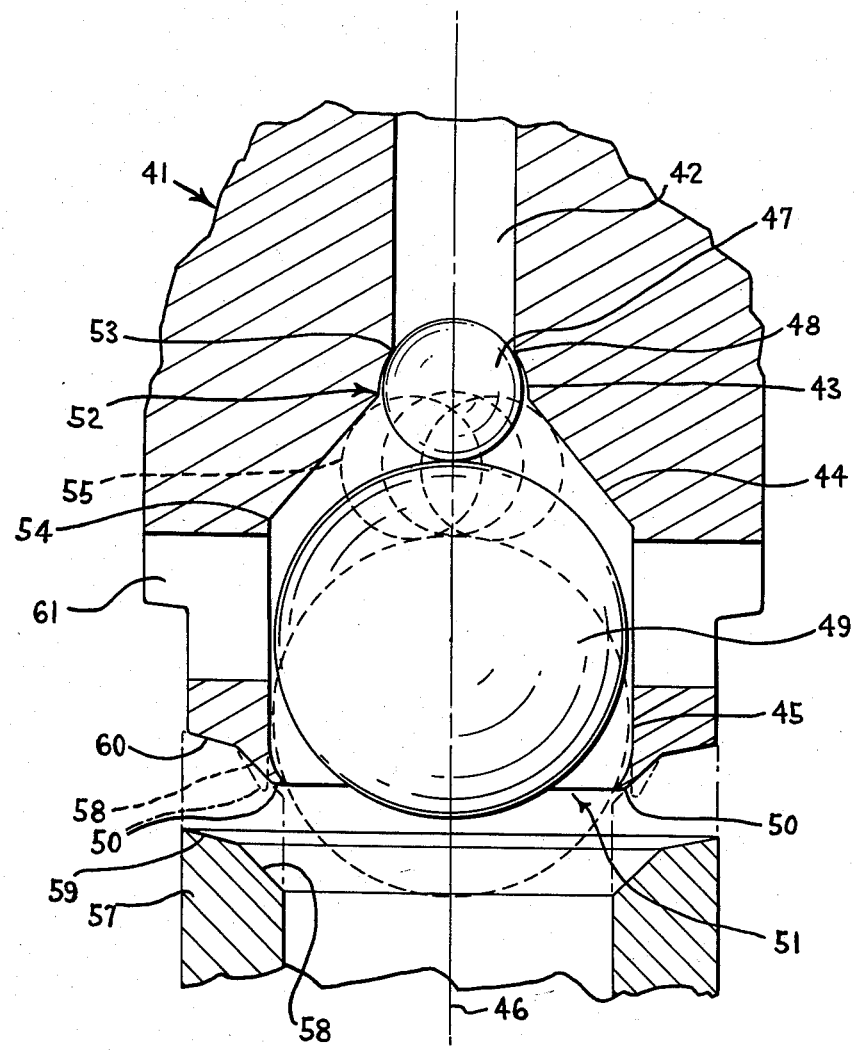
FIG. 6 is an enlarged fragmentary sectional view of a modified form of the invention.

In FIG. 6 there is shown a modification of the valve embodying the invention and which has proven extremely efficient for use with all known carburetors of different makes of cars and which performs very efficiently and consistently under all conditions of driving. This valve, like the previously described valve, embodies a main body portion 41 having a cylindrically shaped passageway 42 of a controlled diameter therein. The passageway 42 in this instance communicates with a relatively narrow curved annular valve seat 43 which, in turn, communicates with a hollow tapered section 44. The hollow tapered section 44, in turn, communicates with a cylindrically shaped recessed area 45 having side walls which are parallel with the longitudinal axis 46 of the valve. A small ball valve 47 of a given preselected size is adapted to engage the relatively narrow curved annular valve seat 43 and is adapted to have substantially line contact with the circular edge 48, which edge is the line of intersection between said annular valve seat and the passageway 42. The small ball valve is adapted to be engaged by a large ball 49 located within the cylindrically recessed area 45. The large ball 49 is loosely retained in said recessed area by an inturned lip 50 which surrounds the open end 51 of said cylindrically recessed area.

The essence of the invention, in this particular construction, is that the passageway 42, relatively narrow annular curved seat 43, the hollow tapered section 44 and the cylindrically recessed area 45 are all carefully controlled as to their related dimensions, in accordance with the preselected diameter of the small ball valve 47, and are also controlled so as to be in proper aligned relation with each other along the longitudinal axis 46 of the valve.

While the small ball valve may be of different sizes, in accordance with different fuel line pressures, it has been found, in order to produce maximum efficiency with various different types of carburetors, that the passageway 42 be circular and of a diameter of from 80% to 85% that of the diameter of the small ball valve.

In other words, if the small ball, as given in the following example, is of stainless steel of about .09 gram in weight and of a diameter of about 7/64 of an inch (.1093 of an inch) the diameter of the passageway 42 will be of from about .085 to .093 of an inch. The relatively narrow curved valve seat, in this instance, is controlled to be of from about .004 to .006 of an inch larger in curvature than the curvature of small ball valve 47 or approximately 4% larger in curvature than said small ball valve. The curved valve seat 43 is of from about .015 to .030 of an inch in width.

The preferred angle of the hollow tapered section 44 with the above dimensions, and with the dimensions of the large ball and recessed area to be given hereinafter, is approximately 41° with respect to the longitudinal axis 46 of the valve and intersects and therefore communicates with the curved annular 43 in such manner as to provide a mouth portion 52 leading into said annular curved valve seat of a diameter of approximately 104% larger than the diameter of the small ball valve or approxiamtely .114 of an inch in width. This causes the small ball valve member to have line contact with the intersecting edge 53 of said curved annular valve seat with the passageway 42 and provides a clearance on each side of said small ball valve member 47 to reduce molecular attraction.

The large ball member 49 in the present example is of stainless steel of about 1.45 gram in weight and of a diameter ranging from approximately 250% to 300% that of the small ball valve 47 or, in the present instance, is preferably 9/32 of an inch in diameter. The cylindrically recessed area 45 is of a diameter of from about .0109 to .013 of an inch larger than the diameter of the large ball member to permit free and loose movement thereof. The open end 51 of the cylindrically recessed area within the area of the inturned lip 50 which loosely retains the large ball member 49 in said recess is of a diameter such as to permit the large ball member, when in engagement with the inner edge of said inturned lip, to protrude outwardly thereof of from about .085 to .110 of an inch. The length of said cylindrically recessed area from said inturned edge to the point of intersection 54 thereof with said tapered wall 44 is such that when the large ball 49 is engaged and raised by the contact 27 of the float lever 24 in response to the rise of fuel in the fuel chamber and is caused to move the small ball valve member 47 into intimate closed line contact with the curved valve seat 43, the large ball member will still protrude outwardly of said open end 51 by an amount of from about .045 to .055 of an inch. The range of movement of the large ball member is such as to prevent the small ball valve 47 from being displaced from within said tapered hollow section 44 when forced away from the valve seat 43 by the pressure of the fuel line as shown by the dash lines 55 in FIG. 6. The related size of the small ball valve 47 and passageway 42 is such as to expose an area of said small valve which is controlled according to the pressure of the fuel line so as to ensure positive displacement of the small ball valve from the valve seat when the float lowers in the fuel chamber 22. The above-mentioned related sizes are so controlled as to cause the small ball valve to spin in response to the flow of fuel about said valve and provides a self-cleansing function.

It is pointed out that all of the above-mentioned inner surfaces of the valve member are carefully finished or burnished to insure that there are no protrusions thereon.

It is further to be understood that the related proportions of the parts of the valve defined above are designed for use with a fuel pump pressure of from 4 to 6 lbs. per square inch and the same proportions are retained with any of the fuel line pressures of different automotive vehicles with the exception that they are increased in related sizes in accordance with the increase of fuel pressure. However, as stated above, the valves will, in all instances, have their various parts formed in the same related proportions. The related dimension therefore of the small ball valve 47 and the passageway 42, together with the curved valve seat 43, is very important, as one size controls the related size of the other of said parts. As the passageway increases in size in accordance with the larger size of the small ball valve required for a particular carburetor, more area of the small ball valve is exposed to the pressure of the fuel line. This requires more float pressure to keep the small valve closed against the fuel line pressure. Thus, the related proportions of the small ball valve and passageway must be controlled in accordance with the float pressure to produce the desired opening and closing action of the small ball valve and must be such as to give instantaneous response in accordance with the level of fuel in the fuel chamber. It has been found that the above related dimensions, therefore, are extremely critical.

The preferred diameter of the passageway is from .090 to .091 of an inch or 17% to 18% smaller than the diameter of the small ball valve which is given in the example set forth above as being 7/64 of an inch in diameter. This is to allow the small ball to enter and extend into the passageway at the end thereof which communicates with the curved valve seat.

It has also been found that the taper of the hollow section 44 is also critical and while stated above as being preferably of an angle of 41° it must be such as to allow the small ball valve to be dislodged from the valve seat and to spin in response to the flow of fuel when the valve is open. As the angle is decreased, the small ball valve will spin at too rapid a speed and will be hindered in its closing effects in response to the rise of the float. On the other hand, if its angle is too large it will permit the small ball valve 47 to go out too far during its spinning action and stick between the large ball and the angle of the hollow section 44.

The above related dimensions therefore are carefully retained so as to permit the small ball valve to be dislodged from the valve seat by the fuel pressure when the float lowers in the fuel chamber and to spin and have a so-called self-cleansing action and to constantly insure that the small ball valve will quickly and positively respond to the rise of the float in the fuel chamber against the pressure of the fuel line. This is to permit the small ball valve to be held in closed position until the fuel again lowers in the fuel chamber. The opening and closing of the small ball valve is such as to instantaneously keep pace with the change of fuel level in the chamber.

It has been found from experience that a valve having its various correlated parts controlled in accordance with the above related dimensions and percentages, produces an extremely simple, durable and efficient valve.

The lip 50 is tapered outwardly to a relatively thin sharp edge and is struck inwardly a controlled amount by a tool 57, diametrically illustrated in FIG. 6. The tool has a controlled taper 58 and an end 59 adapted to engage a stop surface 60 formed on the adjacent end of the main body portion of the valve. This is to insure a standard inward deflection of said tapered lip 50. This control of the inward deflection of the lip 50 is important in that it must be such that the large ball valve will not stick within the open end 51 and care is exercised that the inner surface of said lip 50 has no puckering or flaking. The opening end 51 is preferably of from 6 to 7 thousandths of an inch smaller than the diameter of the large ball member 49 when the lip 50 is struck inwardly the predetermined amount set forth above. It is to be understood that the dimension of the lip and the taper 58 is so controlled as to bring about this result.

In order to permit the fuel to flow outwardly of the valve, the side walls of the cylindrically recessed area 45 have perforations 61 therein.

With the above arrangement there is no tendency of the small ball valve to tilt relative to the seat when the carburetor is tilted by different inclinations of the vehicle as is the case with prior art needle valves and no leakage can, therefore, take place. The large ball member is free to rotate and in no way hinders the function of the small ball valve. The fact that both balls rotate and present different locations of engagement with each other and of the small ball valve with the valve seat life and durability of the valve in general is greatly increased.

While the balls have been described as being preferably of stainless steel, it is to be understood that other suitable materials may be used.

From the foregoing description it will be seen that simple, efficient, and economical fuel control valve means has been provided for use with carburetors for internal combustion engines which is not only sensitive and positive in its function but which is also much more durable and efficient and by means of which much less gas consumption is attained.

While applicant has shown and described his preferred construction of valves and one position of use thereof, it is to be understood that many changes may be made in the details of construction and different positions of use thereof may also be made without departing from the spirit of the invention as expressed in the accompanying claims as the preferred valves only have been shown and described by way of illustration.

Having described my invention, I claim:

1. A fuel control valve for use with carburetors for internal combustion engines comprising a main body portion having accurately axially aligned along the longitudinal axis thereof a fuel passageway, a relatively narrow curved annular valve seat communicating with said passageway, a hollow tapered section having its tapered walls in converging communicating relation with said curved seat, a cylindrically shaped recessed area having an open end and perforated side walls parallel with said lonigtudinal axis and communicating with said hollow tapered section, a relatively small ball valve in said annular seat, a separate relatively large ball in said cylindrically recessed area and adapted to engage said small ball valve in one position of movement thereof to hold said small ball valve in engagement with said valve seat and in another position permit said small ball valve to be dislodged from said seat, and means on the edge of said open end for loosely retaining said large ball in said recessed area, said passageway being of a diameter 80 to 85 percent of the diameter of said small ball valve, the narrow curved annular seat being of a width from .015 to .030 of an inch and its curvature being from .004 to .006 of an inch larger than the curvature of said small ball valve, the angle of the walls of the hollow tapered section with respect to the longitudinal axis of the fuel passageway being approximately 41° and the size of said hollow tapered section being such as to house the major portion of the small ball valve therein when said valve is in engagement with the valve seat, the large ball being from 250 to 300 percent larger than the small ball valve and said cylindrical recessed area being of a diameter of from .0109 to .013 of an inch larger than the diameter of said large ball and of a length from the edge of said open end such as to permit the large ball, when in engagement with and in a position to hold the small ball valve in engagement with the valve seat, to extend outwardly of said open end from .045 to .055 of an inch and further of such length as to cause the large ball to prevent the small ball valve from being completely dislodged from within the hollow tapered section when the large ball is permitted to protrude its fullest extent outwardly of said open end.

2. A fuel control valve for use with carburetors for internal combustion engines comprising a main body portion having accurately axially aligned along the longitudinal axis thereof a fuel passageway, a relatively narrow curved annular valve seat communicating with said passageway, a hollow tapered section having its tapered walls in converging communicating relation with said curved seat, a cylindrically shaped recessed area having an open end and perforated side walls parallel with said longitudinal axis and communicating with said hollow tapered section, a relatively small ball valve in said annular seat, a separate relatively large ball in said cylindrically recessed area and adapted to engage said small ball valve in one position of movement thereof to hold said small ball valve in engagement with said valve seat, and in another position permit said small ball valve to be displaced from said seat, and an inturned lip on the edge of said open end for loosely retaining said large ball in said recessed area, said passageway being of a diameter 80 to 85 percent of the diameter of said small ball valve, the narrow curved annular seat being of a width from .015 to .030 of an inch and its curvature being from .004 to .006 of an inch larger than the curvature of said small ball valve, said hollow tapered section at its narrowest end being of the same diameter as the diameter of the mouth of the seat and at its widest end being of the same diameter as the cylindrically recessed area, said hollow tapered section having its side walls disposed at an angle of approximately 41° relative to said longitudinal axis, the large ball being from 250 to 300 percent larger than the small ball valve and said cylindrical recessed area being of a diameter of from .0109 to .013 of an inch larger than the diameter of said large ball and of a length from the edge of the inturned lip on said open end such as to permit the large ball, when in engagement with and in a position to hold the small ball valve in engagement with the valve seat, to extend outwardly of said open end from .045 to .055 of an inch and further of such length as to cause the large ball to prevent the small ball valve from being completely dislodged from within the hollow tapered section when the large ball is permitted to protrude its fullest extent outwardly of said open end.

3. A fuel control valve for use with carburetors for internal combustion engines and with a fuel line pressure of from 4 to 6 lbs. per square inch comprising a main body portion having accurately axially aligned along the longitudinal axis thereof a fuel passageway, a relatively narrow curved annular valve seat communicating with said passageway, a hollow tapered section having its tapered walls in converging communicating relation with said curved seat, a cylindrically shaped recessed area having an open end and perforated side walls parallel with said longitudinal axis and communicating with said hollow tapered section, a relatively small ball valve in said annular seat, a separate relatively large ball in said cylindrically recessed area and adapted to engage said small ball valve and in one position of movement thereof hold said small ball valve in engagement with said valve seat, and means adjacent the end of said open end for loosely retaining said large ball in said area, said small ball valve being approximately 7/64 of an inch in diameter, said passageway being of a diameter of approximately .091 of an inch, the narrow curved annular seat being of a curvature approximately 4 percent larger than the diameter of the small ball valve, the walls of said hollow tapered section being at an angle of approximately 41° relative to said longitudinal axis, the large ball being from 250 to 300 percent larger than the small ball valve and said cylindrical recessed area being of a diameter from .0109 to .013 of an inch larger than the diameter of said large ball and of a length from said open end and the means adjacent said end for holding the large ball therein as to permit the large ball, when in engagement with and in a position to hold the small ball valve in engagement with the valve seat, to extend outwardly of said open end from .045 to .055 of an inch and when said small ball valve is fully disengaged from said valve seat to protrude outwardly of said open end from .085 to .110 of an inch whereby the large ball member, when in said latter position, will prevent the small ball valve from being completely dislodged from within the hollow tapered area.

4. A fuel control valve for use with carburetors for internal combustion engines comprising a main body portion having accurately axially aligned along the longitudinal axis thereof a fuel passageway, a relatively narrow curved annular valve seat communicating with said passageway, a hollow tapered section having its tapered walls in converging communicating relation with said curved seat, a cylindrically shaped recessed area having an open end and perforated side walls parallel with said longitudinal axis and communicating with said hollow tapered section, a relatively small ball valve in said annular seat, a separate relatively large ball in said cylindrically recessed area and adapted to engage said small ball valve and in one position of movement thereof hold said small ball valve in engagement with said valve seat, and means adjacent the edge of said open end for loosely retaining said large ball in said area, said small ball valve being of preselected size, said passageway being of a diameter 80 to 85 percent of the diameter of said small ball valve, the narrow curved annular seat being of a width from .015 to .030 of an inch and its curvature being from .004 to .006 of an inch larger than the curvature of said small ball valve, the large ball being from 250 to 300 percent larger than the small ball valve and said cylindrical recessed area being of a diameter from .0109 to .013 of an inch larger than the diameter of said large ball and of a length from said open end such as to permit the large ball, when in engagement with the small ball valve when, in turn, is in engagement with the valve seat, to extend outwardly of said open end from .045 to .055 of an inch, and a bar-like magnet internally of the passageway and having an end portion located adjacent and adapted to aid in holding said small ball valve in engagement with said valve seat, said bar-like magnet having a side wall portion spaced from the inner wall of the passageway so as to allow fuel to pass through said space.

5. A fuel control valve for use with carburetors for internal combustion engines of the type embodying a fuel reservoir, a fuel line for feeding fuel under pressure into said reservoir and a float having engagement means for engaging and operating said fuel control valve, said valve comprising a unitary main body portion of rigid material having a restricted fuel passageway therein, means on one end of said body portion for coupling said restricted passageway to said fuel line, said body portion having a hollow tapered section internally thereof of a controlled length and of a given taper and having an integral valve seat adjacent its narrowest end and in communicating relation with said passageway, a relatively small independently rotatable ball valve of a size slightly larger than the diameter of said restricted passageway and controlled in accordance with the taper of said hollow tapered section and such as to have the major portion thereof lying within said tapered section and to have line contact with said seat when in engaging relation therewith, an enlarged cylindrically shaped open area in said body portion having straight parallel sides communicating with and being of the same diameter as the largest end of the hollow tapered section, said parallel sides having perforations therein, a separate enlarged ball member freely rotatably supported in said cylindrically shaped open area and of a diameter slightly less than the diameter of said area, said open area extending outwardly of the end of the body portion opposite the restricted passageway, said end of the body portion having an internally disposed lip for retaining the enlarged ball member in said open area, said enlarged ball member having only a restricted portion thereon projecting outwardly of the internally disposed lip adapted to be engaged by said engagement means, said enlarged ball member being in engaging relation with the small ball valve intermediate said small ball valve and the engagement means and being adapted to impart movement to said small ball valve when said enlarged ball member moves in response to the movement of said engagement means, said fuel passageway, hollow tapered section, valve seat and small ball valve being in a substantially axially aligned relation when the fuel control valve is closed and said small ball and the taper of said tapered section being so dimensionally related and controlled as to cause said small ball valve to spin when the control valve is open and fuel is passing under pressure through said tapered section of said fuel control valve.

References Cited by the Examiner
UNITED STATES PATENTS 766,416   8/04   Booth _____ 137—449 XR
2,975,798  3/61   Jones _____ 137—445
3,013,576  12/61  Read _____ 137—449 XR WILLIAM F. O'DEA, Primary Examiner.

LAVERNE D. GEIGER, Examiner.